(12) United States Patent
Shah et al.

(10) Patent No.: US 12,118,050 B2
(45) Date of Patent: Oct. 15, 2024

(54) SYSTEMS AND METHODS FOR ANALYTICS PRESENTATION ON LARGE DISPLAYS

(71) Applicant: MicroStrategy Incorporated, Tysons Corner, VA (US)

(72) Inventors: Utkarsh Shah, Silver Spring, MD (US); Hui Yuan, Fairfax, VA (US); Nida Imtiaz, Vienna, VA (US); Victor Hugo Pena, Falls Church, VA (US); Jose Manuel Nocedal De La Garza, Leesburg, VA (US); Abhijeet Roy, South Riding, VA (US)

(73) Assignee: MicroStrategy Incorporated, Tysons Corner (VA)

( * ) Notice: Subject to any disclaimer, the term of this patent is extended or adjusted under 35 U.S.C. 154(b) by 51 days.

(21) Appl. No.: 17/084,574

(22) Filed: Oct. 29, 2020

(65) Prior Publication Data

US 2021/0133269 A1 May 6, 2021

Related U.S. Application Data

(60) Provisional application No. 62/928,456, filed on Oct. 31, 2019.

(51) Int. Cl.
| | | |
|---|---|---|
| *G06F 16/9538* | (2019.01) | |
| *G06F 16/9535* | (2019.01) | |
| *H04L 9/40* | (2022.01) | |
| *G06F 3/04847* | (2022.01) | |
| *G06F 3/14* | (2006.01) | |

(52) U.S. Cl.
CPC ...... *G06F 16/9538* (2019.01); *G06F 16/9535* (2019.01); *H04L 63/08* (2013.01); *G06F 3/04847* (2013.01); *G06F 3/14* (2013.01)

(58) Field of Classification Search
CPC ............ G06F 16/9538; G06F 16/9535; G06F 3/04847; G06F 3/14; H04L 63/08
USPC ......................................................... 707/722
See application file for complete search history.

(56) References Cited

U.S. PATENT DOCUMENTS

| | | | | |
|---|---|---|---|---|
| 7,640,511 | B1* | 12/2009 | Keel ...................... | G06Q 10/10 |
| | | | | 707/999.102 |
| 10,200,236 | B1* | 2/2019 | Lewis ..................... | H04L 41/22 |
| 10,261,589 | B2* | 4/2019 | Sakai .................... | G06F 3/0488 |
| 11,019,191 | B1* | 5/2021 | Gorsica, IV .......... | H04W 12/42 |
| 11,194,717 | B2* | 12/2021 | Soini ................... | G06F 12/0815 |
| 2007/0057037 | A1* | 3/2007 | Woronec .............. | G06Q 20/342 |
| | | | | 235/493 |
| 2008/0031203 | A1* | 2/2008 | Bill ....................... | H04W 8/005 |
| | | | | 370/338 |

(Continued)

*Primary Examiner* — Amy Ng
*Assistant Examiner* — Antonio J Caiado
(74) *Attorney, Agent, or Firm* — Bookoff McAndrews, PLLC

(57) ABSTRACT

A method for analytics presentation on large displays may include receiving, at a client device, login information for a user, retrieving, from a database, user preference information for the user, obtaining an initial set of information cards based on the user preference information, transmitting the initial set of information cards to a shared display connected to the client device, receiving, from the user by way of the client device, a user request for additional or alternative information, obtaining a modified set of information cards based on the user request, and transmitting the modified set of information cards to the shared display.

20 Claims, 11 Drawing Sheets

(56) References Cited

U.S. PATENT DOCUMENTS

| | | | | |
|---|---|---|---|---|
| 2011/0185437 A1* | 7/2011 | Tran | .................... | H04L 63/104 |
| | | | | 726/28 |
| 2013/0332962 A1* | 12/2013 | Moritz | ............. | H04N 21/44218 |
| | | | | 725/46 |
| 2014/0173501 A1* | 6/2014 | Wu | ........................ | G06Q 50/01 |
| | | | | 715/781 |
| 2014/0259184 A1* | 9/2014 | Hoyer | ................. | G06F 21/6245 |
| | | | | 726/28 |
| 2015/0033149 A1* | 1/2015 | Kuchoor | ............ | H04N 21/4782 |
| | | | | 715/753 |
| 2015/0046834 A1* | 2/2015 | Wu | ........................ | H04L 51/04 |
| | | | | 715/748 |
| 2015/0163206 A1* | 6/2015 | McCarthy | ............ | G06F 21/6227 |
| | | | | 726/4 |
| 2015/0278534 A1* | 10/2015 | Thiyagarajan | .......... | G06F 21/84 |
| | | | | 726/28 |
| 2016/0261658 A1* | 9/2016 | Taylor | .................... | H04L 65/612 |
| 2017/0076321 A1* | 3/2017 | Reznek | ............. | G06Q 30/0246 |
| 2018/0013844 A1* | 1/2018 | Foged | .................... | H04L 51/52 |
| 2018/0121503 A1* | 5/2018 | Bakke | ................. | G06F 16/2246 |
| 2018/0253163 A1* | 9/2018 | Berger, Jr. | ............ | G06F 3/0383 |
| 2018/0350144 A1* | 12/2018 | Rathod | ............. | G06Q 20/3224 |
| 2019/0130468 A1* | 5/2019 | Lerman | ............. | G06F 16/90332 |
| 2020/0029113 A1* | 1/2020 | Dacus | ................ | H04N 21/4532 |
| 2020/0251111 A1* | 8/2020 | Temkin | .................... | G10L 15/22 |
| 2021/0203747 A1* | 7/2021 | Gorsica, IV | .......... | H04L 67/143 |

* cited by examiner

700

MYSTERY COMPANY

JANE THORN  HTTPS://WWW.MYSTERY.COM

🔗 COMPANY DOSSIER

| $33K ASSETS | MN | MMM |
|---|---|---|
| 651-733-111 PHONE | | |
| 5050 PROFITS | | |
| INDUSTRIAL SECTOR | | |
| THE INFORM 2017" DATAS PUBLICLY AV 500 AND IS U | | |

704

| FORMAT NUMBER | AUTO ⊙ |
|---|---|
| PREVIEW | $10K |
| DECIMAL | 0 |
| PERCENT | % ⊙ |
| ABBREVIATION | K/M/B ⊙ |
| 1000 SEPARATOR | 1,000 ⊙ |
| PREFIX | $ |
| SUFFIX | E.G. KM |
| CUSTOM FORMAT | APPLY |

JANE SMITH

DIRECTOR, SALES OPERATIONS • JSMITH@MYSTERYCO.COM

🔗 COMPANY WEBSITE

🔗 HTTP://WWW.MYSTERYCO.COM abc COMPANY WEBSITE

APPLY

712

| PHONE NUMBER | CURRENT CITY | DEPARTMENT |
|---|---|---|
| LEXINGTON HOME TOWN | BOSTON OFFICE LOCATION | SKATEBOARDING FUN FACT |
| NORTH AMERICA REGION | PEOPLE MANAGEMEN... SKILLS | MASSACHUSETTS_INSTITUTE OF... UNIVERSITY |
| 3 TENURE | 0.89 SCORE | 0 PATENTS |

SELF-STARTER WHO WORKS WITH THE TEAM TO BRING THE BEST PRODUCTS TO THE RIGHT CUSTOMERS.

FIG. 7B

SYSTEMS AND METHODS FOR ANALYTICS PRESENTATION ON LARGE DISPLAYS

CROSS-REFERENCE TO RELATED APPLICATION(S)

This application claims the benefit of priority to U.S. Provisional Application No. 62/928,456, filed Oct. 31, 2019, the entirety of which is incorporated by reference herein.

TECHNICAL FIELD

Various embodiments of the present disclosure relate generally to providing contextually-relevant database content on a shared display.

INTRODUCTION

Databases often include information about many topics of interest to individuals or groups of individuals. Display of such database information may bring value to a team or a group of individuals, and may save time switching between multiple applications to get the right information and take action.

SUMMARY OF THE DISCLOSURE

According to certain aspects of the present disclosure, systems and methods are disclosed for providing contextually-relevant database content on a shared display.

In one embodiment, a computer-implemented method is disclosed for analytics presentation on large displays, the method comprising: receiving, at a client device, login information for a user, retrieving, from a database, user preference information for the user, obtaining an initial set of information cards based on the user preference information, transmitting the initial set of information cards to a shared display connected to the client device, receiving, from the user by way of the client device, a user request for additional or alternative information, obtaining a modified set of information cards based on the user request, and transmitting the modified set of information cards to the shared display.

In accordance with another embodiment, a system is disclosed for analytics presentation on large displays, the system comprising: a data storage device storing instructions for analytics presentation on large displays in an electronic storage medium; and a processor configured to execute the instructions to perform a method including: receiving, at a client device, login information for a user, retrieving, from a database, user preference information for the user, obtaining an initial set of information cards based on the user preference information, transmitting the initial set of information cards to a shared display connected to the client device, receiving, from the user by way of the client device, a user request for additional or alternative information, obtaining a modified set of information cards based on the user request, and transmitting the modified set of information cards to the shared display.

In accordance with another embodiment, a non-transitory machine-readable medium storing instructions that, when executed by the a computing system, causes the computing system to perform a method for analytics presentation on large displays, the method including: receiving, at a client device, login information for a user, retrieving, from a database, user preference information for the user, obtaining an initial set of information cards based on the user preference information, transmitting the initial set of information cards to a shared display connected to the client device, receiving, from the user by way of the client device, a user request for additional or alternative information, obtaining a modified set of information cards based on the user request, and transmitting the modified set of information cards to the shared display.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 7A and 7B are diagrams indicating user interfaces for creating or editing information cards.

DETAILED DESCRIPTION OF EMBODIMENTS

Figure 1:
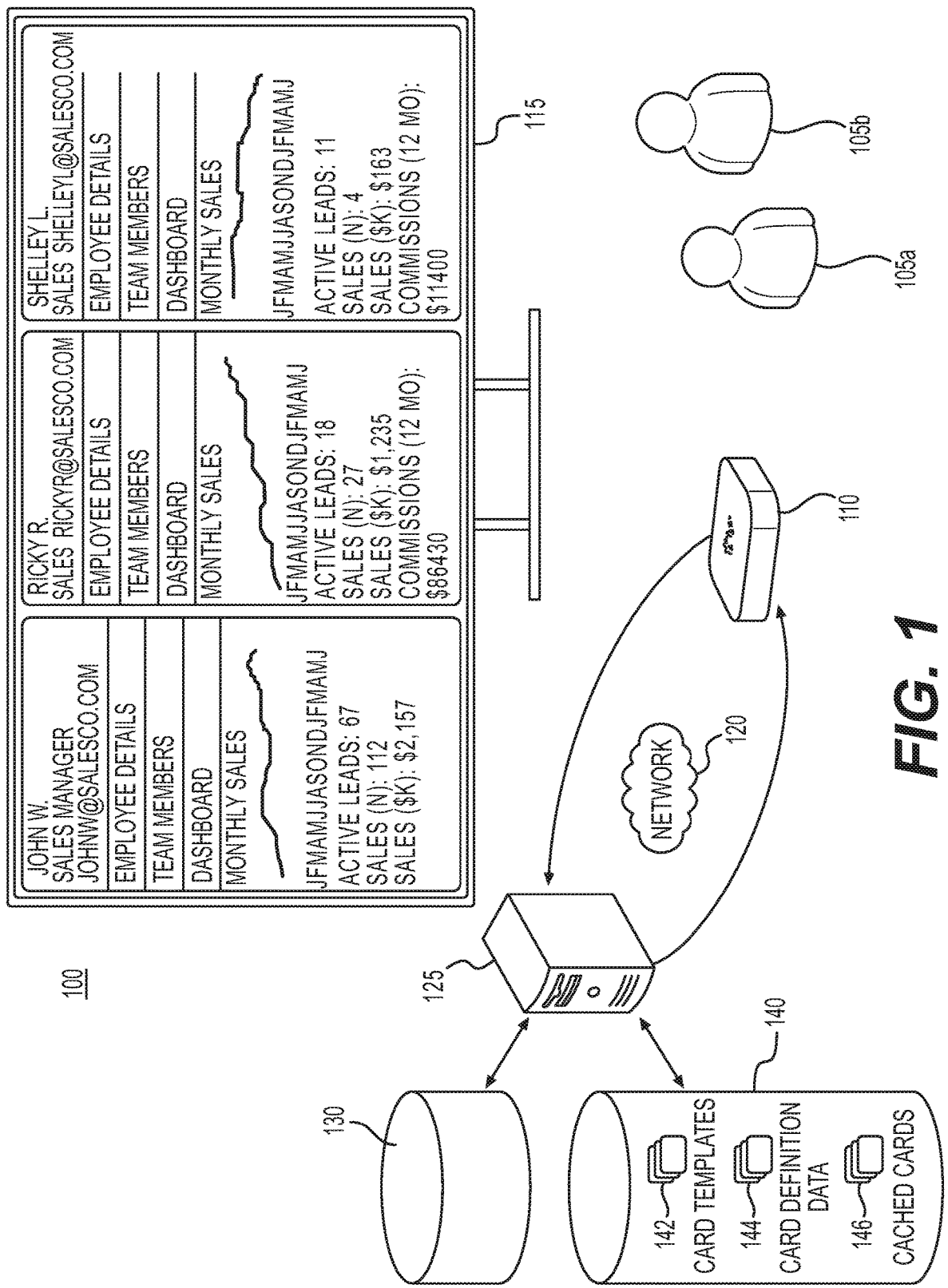
FIG. 1 depicts an exemplary system infrastructure for analytics presentation on large displays, according to one or more embodiments.

Various embodiments of the present disclosure relate generally to providing contextually-relevant database content on a shared display.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Businesses often use web-based information portals and browsers running on desktop computers or mobile devices to display key information to individuals in the organization. However, this model may result in a proliferation of browser windows and tabs that may ultimately obscure more information than is actually made available and may bury crucial information in a sea of noise. This may further lead to each individual focusing on the information apparent to them, but miss other information that may be viewed by someone else. This overload of information may lead to less communication. The problems are made worse when several individuals attempt to make use of a single desktop or laptop display. This may make it more difficult to keep track of important business metrics on a laptop or a web interface for a large group of people.

Small screen devices present additional challenges. For example, the devices must be kept on-hand at all times. Even if the device is immediately available, accessing information may take time due to login and startup processes. Moreover, the business metrics can be consumed by only one person viewing the device at a time. Delays in accessing and sharing information may mean that users miss getting important information at the right time.

Presenting analytics on a large shared display may allow multiple users to see key business metrics at a glance in real time. Viewing such information visually on a large screen may bring a sense of gamification to business processes such as, for example, sales, development processes, and customer service. This may give team members an additional push to achieve more through improved analysis and reactions.

The information presented on a large shared display may change dynamically based on changes to underlying data and the people viewing the display. User may also interact with the displayed information through searching and drilling-down to further refine the information presented.

This type of interaction may provide benefits across a variety of settings. Consider these scenarios.

Assume construction managers (CM) have displays in their offices. The CM can view construction sites on a map presented on a large display. As a project manager (PM) enters the CM's office, the construction site(s) assigned to that PM gets highlighted and key information on that site is displayed to both of them in the office. When more PM's join, an analysis can be done on different sites based on the information. When a safety inspector enters the CM's office, an analysis or trend can be seen on the safety of the site. Thus, the displayed information can change dynamically based on the identity and roles of the people viewing the information.

As another example, John is a sales director. He manages all the sales reps in the North America East Coast Region. He has access to all his reports and customer/prospect information in his territory. John has his own private office and has a semi-private space to hold meetings with his team regularly. John wants to instill a sense of transparency, gamification, and collaborative culture in his team. Which is why he installed a large display in his office and a second in the semi-private space. Within his team, there are territories. He would like to track sales in these territories. Martha, Ricky, and Shelley are territory managers. When Shelley walks into John's office, John's screen filters to Shelley's territory details. John finds out that within the past year there has been a decrease in sales. John talks about it to Shelley to figure out why this happened so that he can help find a solution. If Ricky joins the meeting then some private aspects of Shelley's information may be hidden. One day John and his entire team have a meeting. There is a screen that shows data on all the regions constantly with the right access.

In a software company, a display wall can display key metrics for each scrum team to see progress and performance. Based on the person close to the display wall, the analytics cards may filter to that viewer's team and show a comparison to other teams.

The following discussion and accompanying figures describe systems and methods to support these scenarios and others.

Any suitable system infrastructure may be put into place to allow analytics presentation on large displays. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

FIG. 1 depicts an exemplary system infrastructure for analytics presentation on large displays, according to one or more embodiments. As shown in FIG. 1, a system 100 for analytics presentation on large displays may include client device 110, such as a television set-top box, desktop computer, laptop computer, gaming console, mobile device, such as a smart phone or tablet, or any other suitable device. Client device 110 may be connected to large shared display 115. Shared display 115 may be, for example, a television, computer monitor, video projector, display wall, or any other suitable device. Client device 110 and shared display 115 may be associated with a user, such as user 105a depicted in FIG. 1. Other users 105, such as user 105b, may also view shared display 115. In one or more embodiments, shared display 115 may be implemented as multiple displays. The multiple shared displays may be in a single location or may be distributed in multiple locations associated separately with multiple users, such as in different rooms, offices, buildings, or business locations. Such multiple shared displays may be, for example, a television, computer monitor, or video projector that may be viewed by multiple users, as discussed above, or may be a personal display, such as, for example, a head mounted display. Client device may connect to a server, such as server 125 depicted in FIG. 1, by way of a network 120. Server 125 may have access to at least one source database 130 for an organization. Server 120 can be implemented using multiple computers that cooperate to perform the functions discussed below, and which may be located remotely from each other.

Client device 110 may include an application that enables the client device 110 to dynamically generate and display contextually-relevant information cards in response to certain actions being performed on the client device 110 or certain conditions of the client device 110 being detected. As discussed below, the application may allow the client device 110 to obtain and provide information from the source database 130 through information cards that can be dynamically adjusted based on the actions or conditions detected on the client device 110. In some implementations, the application may run in the background, out of view of the user, and may monitor conditions of the client device 110 on an ongoing basis. The application may interact with an operating system of the client device 110, for example, using one or more application programming interfaces (APIs), to obtain various types of content, such as image data and/or text displayed on screen, image data or text of user interfaces of applications (which may or may not be currently displayed on screen), device notifications, messages (e.g., e-mails or SMS text messages), calendar data, received radiofrequency beacon messages, user presence or login information, and so on.

Client device 110 may be associated with a primary user, such as user 105a, by way of a user login or other configuration data. User 105a may then customize various aspects of the system for the user 105a, including the trigger conditions used to detect an appropriate context for providing an information card as well as the type of content included in information cards.

In FIG. 1, information cards are presented on client device 110 as cards that may include information obtained from source database 130. The cards may include dynamically generated information so that they reflect changes to data stored in the source database 130. For example, server 125 can store card templates 142 that identify, for example, the format and structure of the cards. The specific information that is displayed in the cards may be dynamically populated into the templates at the time the cards are determined to be relevant, so that each display of a card includes information generated from up-to-date information from the source database 130. Thus, if the same card for the same entity is displayed at different times, the content may be different for each instance of the card as the information in the source database 130 changes.

Card templates 142 may include different templates for different types of entities. For example, one template may be used for a person, another template may be used for a company, another template may be used for a location (e.g., a particular store or region), and so on. Different card templates 142 may also be defined and used for entities having different semantic relationships with the user 105a, the user's organization, or others. For example, a first template may be used for companies that are customers, and may specify a first set of statistical measures to display in a card. A second template for suppliers may specify a different set of statistical measures to display in a card.

The system can also store card-specific information in card definition data 144 that specifies the parameters of individual cards. The card templates 142 can each represent characteristics of cards for a particular type of entity or class of entities, and the card definition data 144 can specify the particular card parameters for specific entities. Although cards for different entities of the same type may use the same card template 142, each individual card may have specific information that affects its content and presentation. For example, a card definition for a specific entity may include, e.g., an entity identifier, an identifier of the card template to be used for the entity, an indication of the keywords to be used to trigger presentation of the card for the entity, a mapping of data source elements to the components of the card template (if not already specified in the card templates 142), and so on. For example, a card definition for a company "Example Co." may specify that the "CARD_001A" template should be used, and that the specific set of keywords that trigger display of that company's card are "Example Co.," "Example," and "EC." The card definition data 144 can include a card definition record for each information card made available in the system, indicating which entities and keywords to the card templates 142. The card definition data 144 can also be used to customize (e.g., alter or override) aspects of the card templates.

Figure 2B:
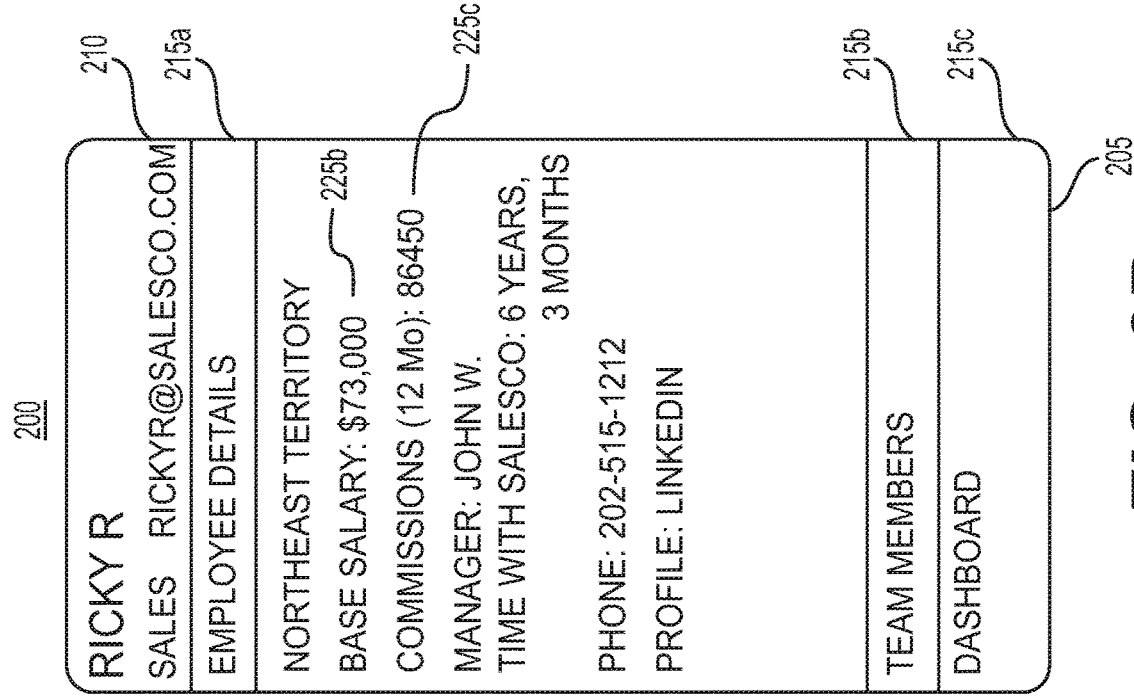
FIGS. 2A-2B are diagrams illustrating examples of an information card, according to one or more embodiments.
Figure 2A:
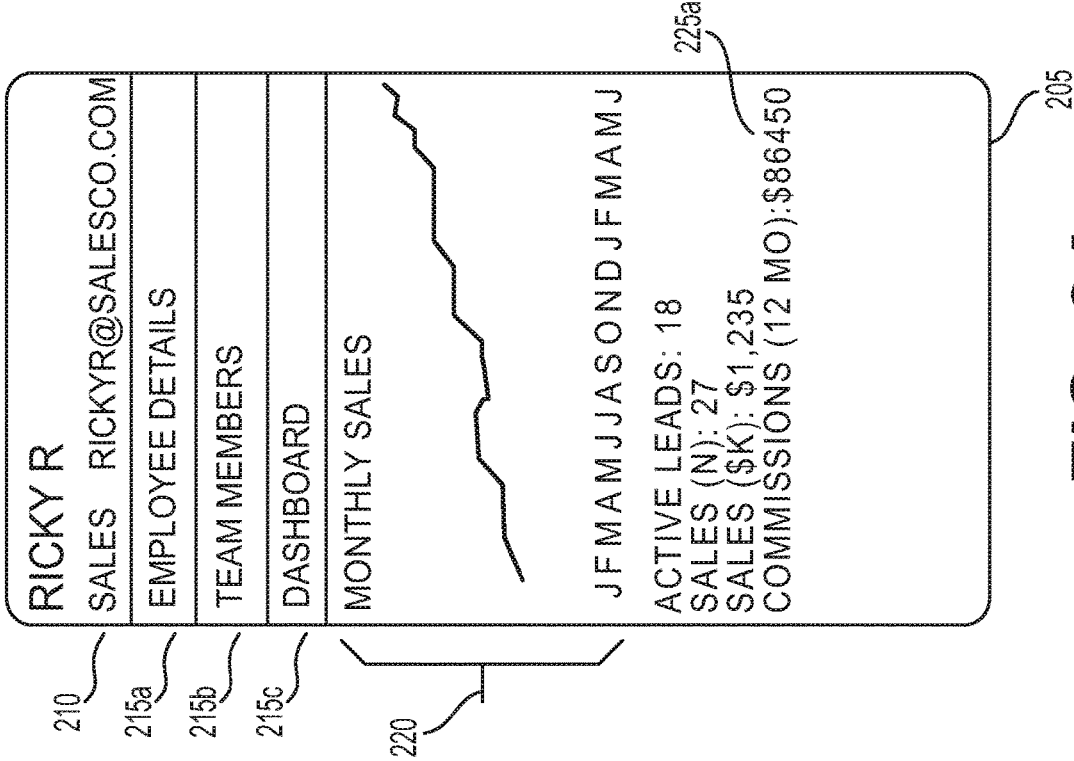

FIGS. 2A-2B are diagrams illustrating examples of an information card 200, according to one or more embodiments. The content and style of information cards can vary from one organization to another, from one entity type to another entity type, and for different entities. In some implementations, the main body of the information card may include various indicators, such as values for attributes and metrics, text, visualizations, or other elements derived from one or more data sets. As noted above, these values may be derived from private data sets, but are not limited to information from private data sets. The indicators may include summary elements, as well as context information. In some cases, at least some of the attributes provided as indicators are tailored to the needs of a specific task or role. Information cards may include text, such as a long-form attribute that includes notes, recommended actions, tasks, and other information.

As shown in FIG. 2A, an information card may include a header portion 210 and one or more additional portions 215. For example, the information card shown in FIG. 2A, which includes data for an employee, includes additional portion 215a for employee details, additional portion 215b for team members, and additional portion 215c for an employee dashboard. These additional portions 215 may all be displayed simultaneously, or one or more additional portions 215 may be collapsed or minimized. For example, in FIG. 2A, additional portions 215a and 215b are minimized to allow additional space for the contents of additional portion 215c.

Cards may be defined in terms of attributes or other data elements in an analytics platform. One card can be defined for an entity type or object type, using the attributes of that entity type or object type. For example, in the card shown in FIG. 2B, the card for an employee can specify a territory attribute, salary and commission attributes, a manager attribute, an employment history attribute, a contact phone number attribute, and a profile link attribute. After this entity type card has been defined, each time an instance of an employee identifier is found, e.g., in on-screen content, and metadata, or in other device context, the entity type card can be used to generate a card for the applicable employee, by populating values for the attributes from one or more data sources. Other attribute types may also be used. For example, as shown in FIG. 2A, the dashboard portion 215c may include a graph of monthly sales for the employee. Other attribute types may include, for example, colors, icons, animations, images, charts, and graphs. Some attributes may be access-restricted according to security settings established when the information card type is created. For example, salary and commission information in attributes 225a, 225b, and 22fc, shown in FIGS. 2A-2B may be restricted to access by the employee and the employee's managers.

Figure 3A:
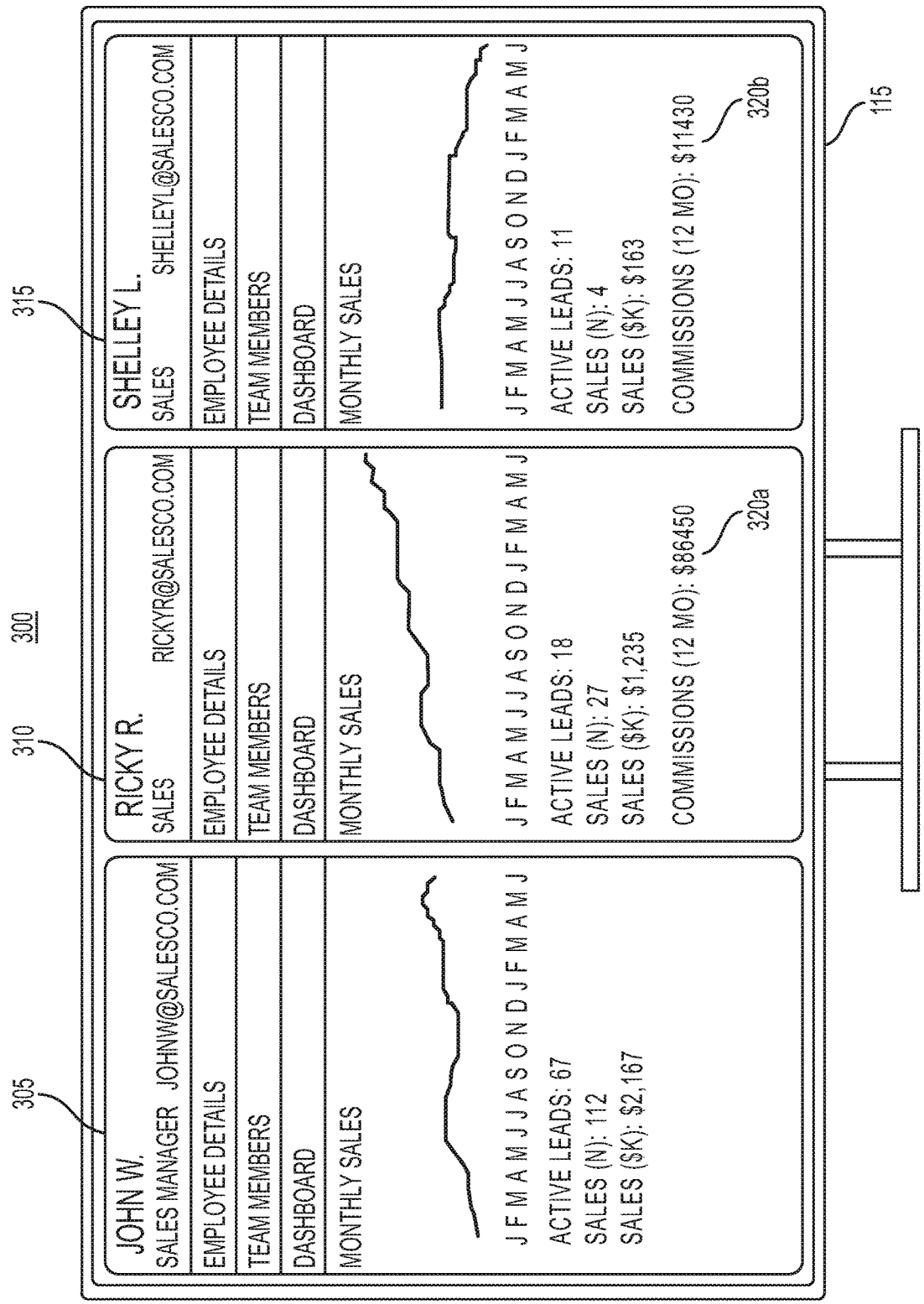
FIGS. 3A-3C depict examples of a user interface for making information cards available on a shared display, according to one or more embodiments.
Figure 3B:
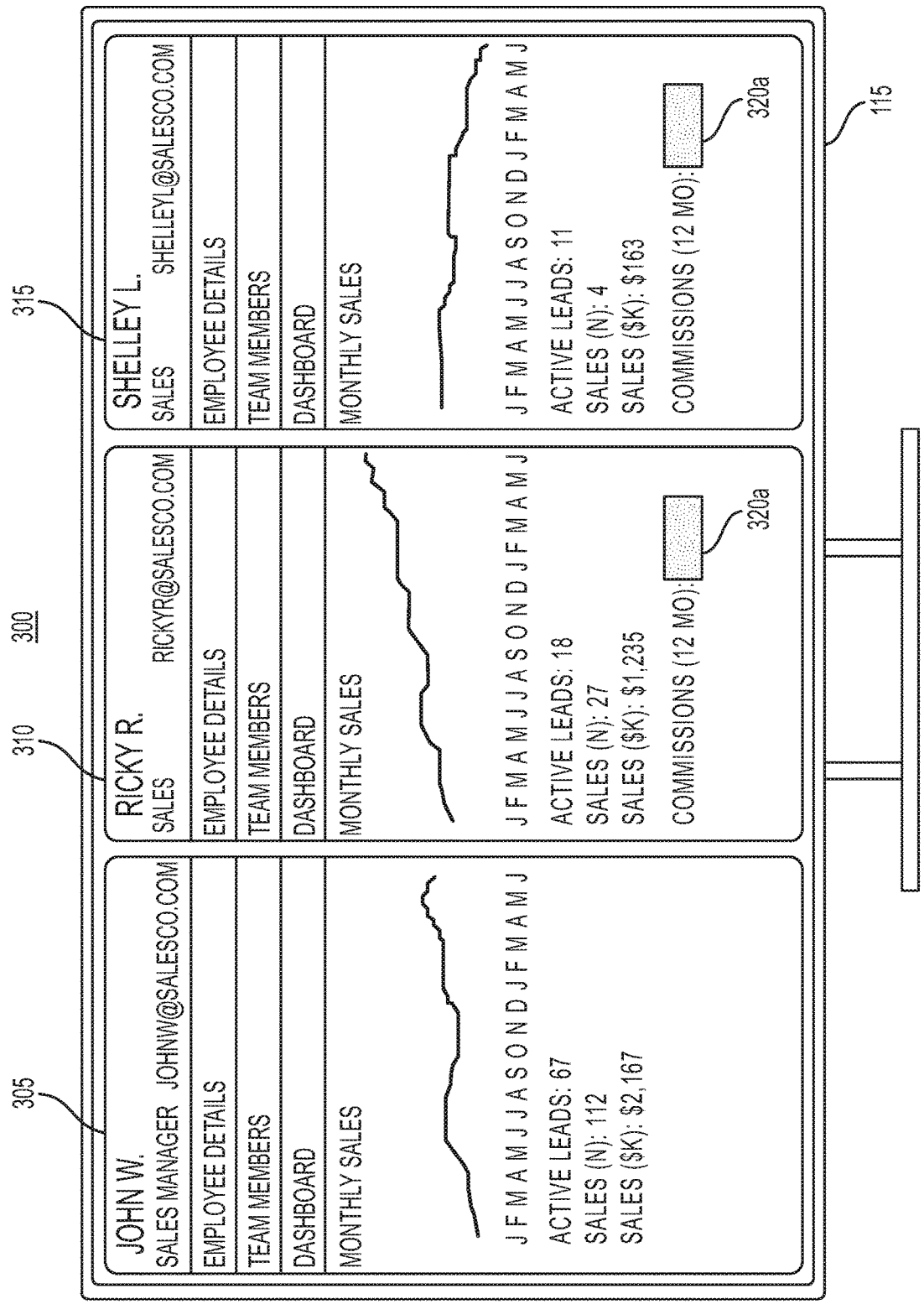
Figure 3C:
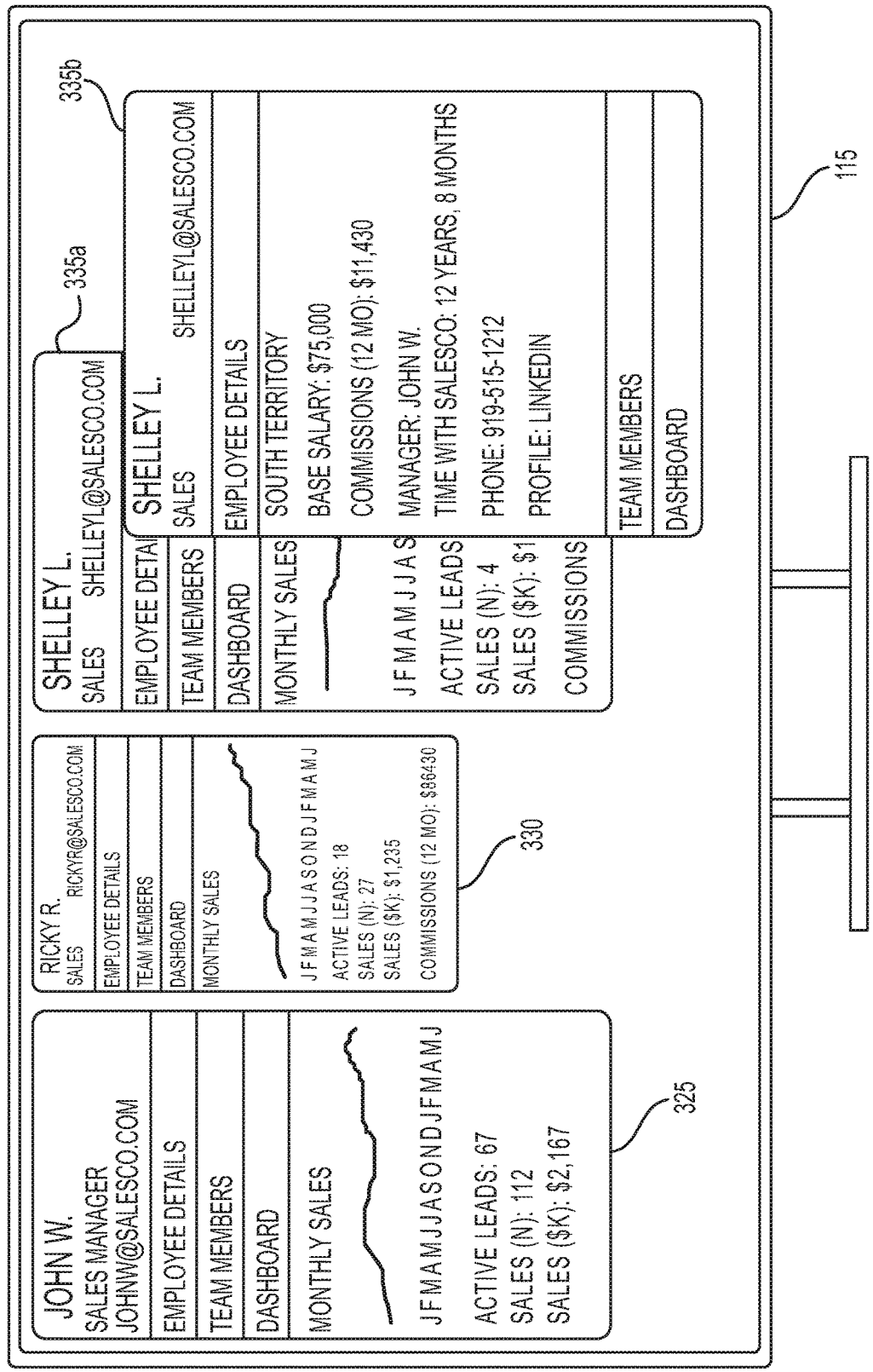

FIGS. 3A-3C depict examples of a user interface for making information cards available on a shared display, according to one or more embodiments. An initial set of information cards may be displayed when a user logs in to client device 110 based on a selection of favorites, or other stored user preferences. The display of additional information cards may be triggered by selected data metrics matching predefined criteria. Through interaction with the display or client device 110, such as, for example, by voice commands, gestures, touch screen features including multi-touch gestures, a user interface device such as a pointer, mouse, or external keyboard, etc., a user may request that information cards be displayed, may search for information cards matching desired criteria, or may dismiss a currently displayed information card. The presence of additional users may be detected by client device 110 such as, for example, through a user login, through detection of a registered mobile device in the vicinity of client device 110 through Bluetooth, Wi-Fi, or other wireless technology, biometric detection such as, for example, face recognition or voice recognition, etc. Detection of the additional users may further be based on the proximity of an additional user to client device 110 or display 115. For example if an additional user is detected by way of Bluetooth or Wi-Fi signals, the user's presence may affect the system if the additional user is with a predefined distance, such as 15 feet. The predefined distance may be set differently for each user device 110 and each display 115. For example, if display 115 is in a private or semi-private space then the predefined distance may be set to the perimeter of the room. In contrast, if display 115 is located in a public space then the predefined distance may be set to a distance at which information presented on display 115 is not legible. If additional users are detected, then the displayed information cards may be modified to include additional information cards or to obscure sensitive information displayed on one or more information cards.

As an example, a supervisor may be conducting a meeting with employee John Smith. The supervisor may have a predetermined level of data access, and so an information card may be displayed on large display that may include information about John Smith. Some of this data may include, for example, salary information. Differing possible information cards may have different predetermined security levels associated with them. In addition, individual data fields on given cards may have differing security levels associated with them. If a second employee walks into the room, or within some other predetermined distance metric, the information card on the large display may automatically disappear. Alternatively, a different information card may appear on the screen that is compatible with the level of security access for the second employee. Alternatively, certain fields, such as the salary field, may disappear from the information card displayed on the screen. When the second employee leaves the room, the salary field, or other restricted fields, may reappear on the information card.

As shown in FIGS. 3A-3C, a user interface 300, provided on a shared display, such as display 115 shown in FIG. 1, may display multiple information cards, such as information cards 305, 310, and 315. As discussed above, information cards may include attributes related to access-restricted information. For example, attributes 320a and 320b shown in FIGS. 3A and 3B may include private information related to commissions earned by each user. Such access-restricted information may remain visible, as in FIG. 3A, when viewed by a user having permission to view the information, or may be obscured, as in FIG. 3B, when viewed by at least one user lacking permission to view the information.

FIGS. 3A and 3B shows information cards 305, 310, and 315 are displayed side-by-side in the same or similar sizes. However, such an arrangement of information cards is not required. As shown in FIG. 3C, an information card may be shown separately at full size, such as information card 325. Alternatively, an information card may be shown at a reduced size to allow the display of additional information cards, such as the "thumbnail" information card 330. The size and location of an information card may be changed by selecting and dragging an edge or corner of an information card. Other controls may be used to change the size of an information card, including, for example, controls embedded in an information card to maximize, minimize, or thumbnail an information card. Gestural controls, such as double-clicking on an information card, or performing other gestures towards and information card, may change the display of an information card. A predefined gesture or control sequence may cause all displayed information cards to be reduced in size and displayed side-by-side, or "tiled." The position of information cards may similarly be changed through the use of gestures and other controls. For example, information cards may also be made to overlap, such as is shown by information cards 335a and 335b in FIG. 3C. A predefined gesture or control sequence may cause all displayed information cards to be displayed in such an overlapping fashion, or "cascaded."

Figure 4:
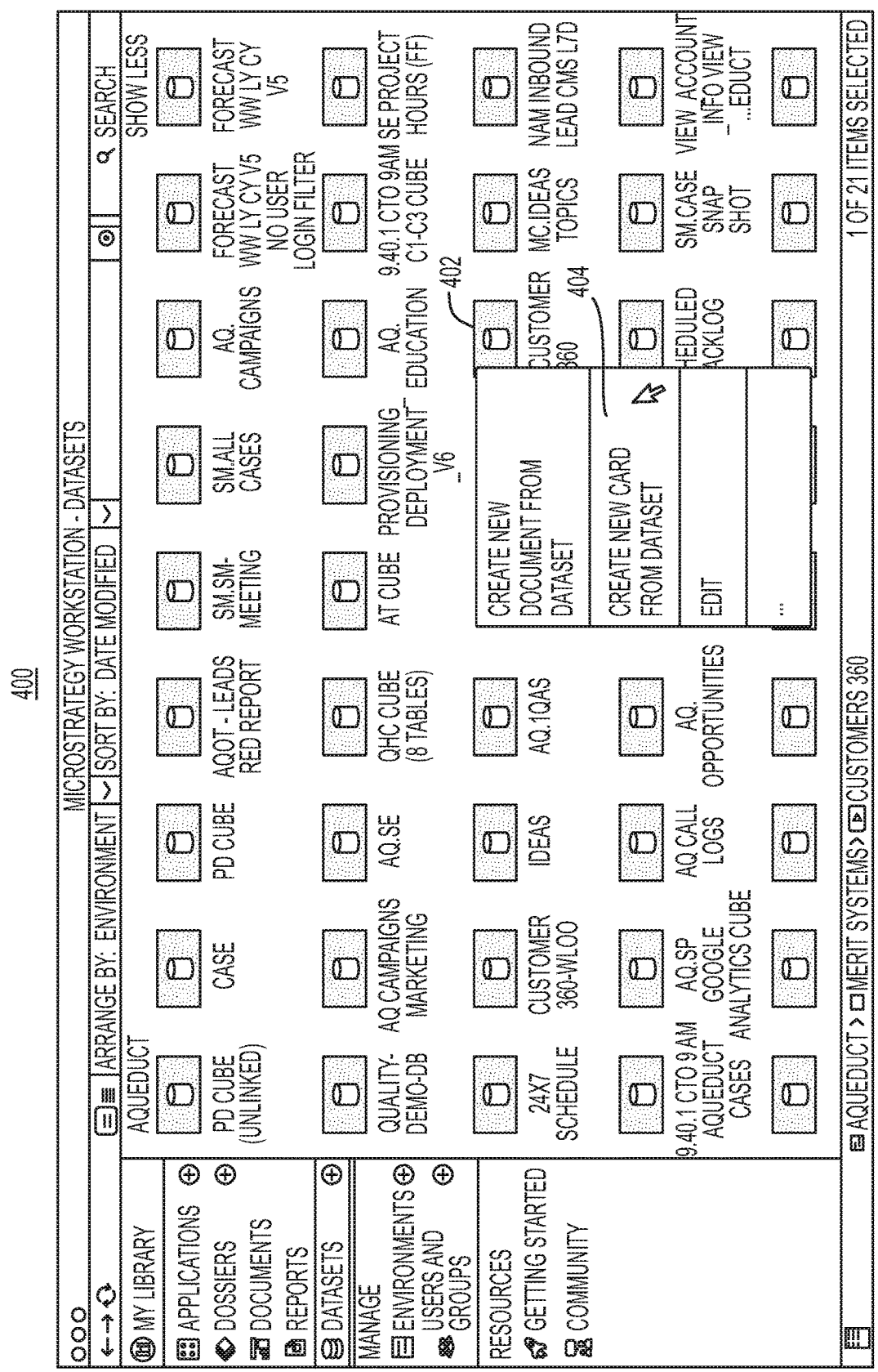
FIGS. 4-6 are diagrams showing user interfaces for creating and managing information cards.

FIG. 4 shows a user interface 400 of a client device, such as may be displayed on display 115 connected to client device 110 from FIG. 1, which can be used to initiate the creation of a new card from a data set. The user interface 400 shows various data sets that are available in an analytics platform.

The process of creating an information card can include a user importing, identifying, selecting, or otherwise accessing a dataset. This can be done through any interface or gateway of an analytics platform. As an example, a user may create or access a data cube (e.g., an online analytical processing cube) or other data set. The user can select the data set and interact with controls to begin creating an information card from the cube. In some cases, this can be as simple as a "right-click" or hover over an icon representing the data set, and selecting an option for creating a card, such as an item "create a card" or "publish to extensions" from a context menu that appears. The indication that a card should be made can cause the system to provide a card creation user interface that shows properties of the data set, such as a list of attributes, metrics, entities, or other elements referenced in the data set.

In the example of FIG. 4, a user may select one of the data sets, for example by selecting an icon 402 for the data set, and in response the system may show a context menu with various options. One of those options, for example, may be item 404, an option to create a new card from the data set. Selecting this option may cause the system to provide the user interface shown in FIG. 5.

Figure 5:
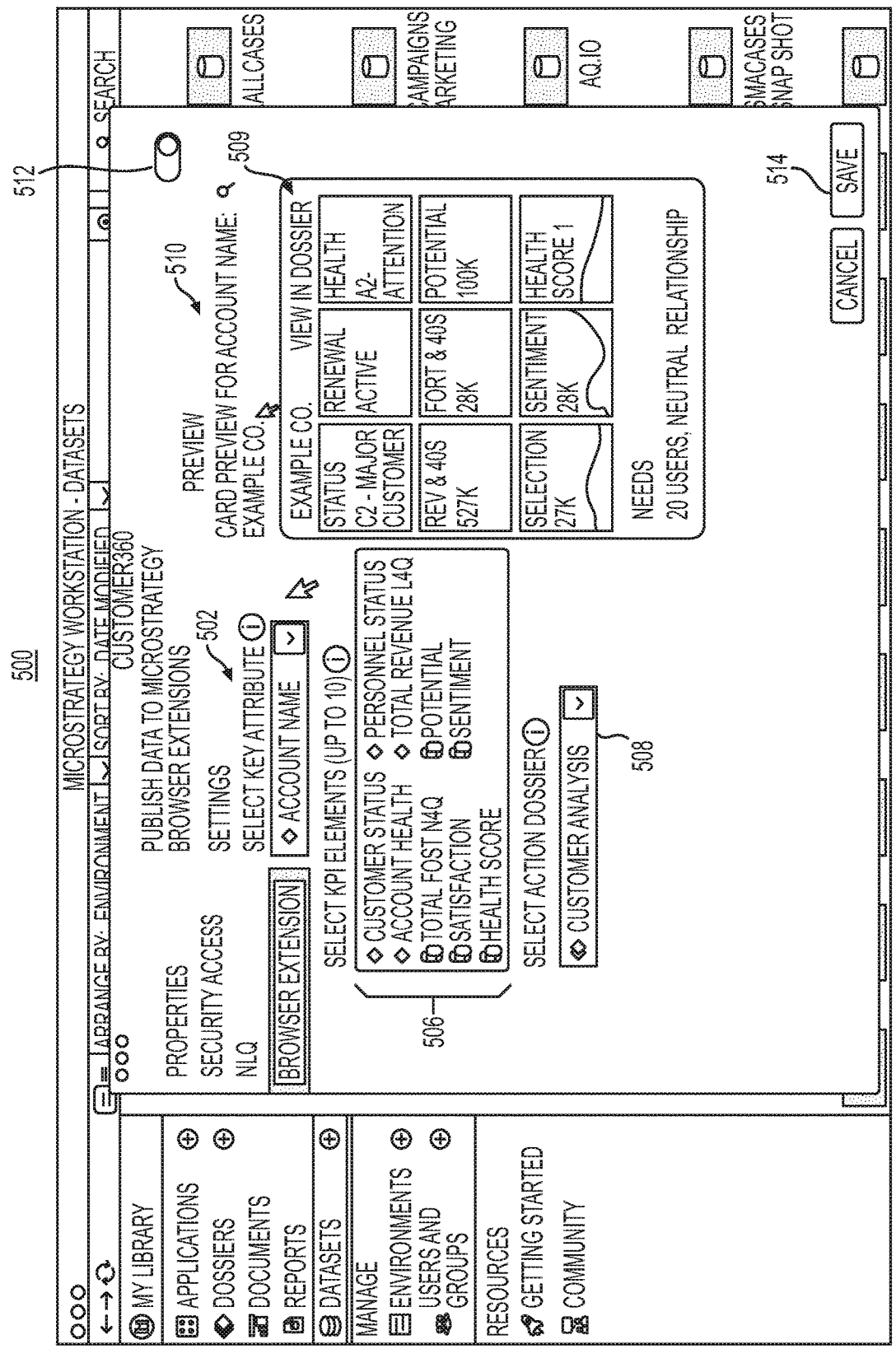

FIG. 5 shows an example card creation interface 500 that allows the user to define the content and characteristics of a card. The card creation user interface 500 can include a settings pane 502 showing elements of the data set, as well as a preview pane 510 that previews how the card will look and can be manipulated to place and organize elements to be displayed in the card.

The user interface 500 may display data elements from the data set that may be used to define the card. These may be shown, for example, in a settings pane, such as settings pane 502 shown in FIG. 5. One of the data elements may be designated as a key attribute, for example, by selection from a list using a drop-down menu 502. The key attribute can specify the main entity type for object type that the card will represent. In the example, a key attribute of "account name" may selected, and as a result, the card being generated may be used to create individual cards for different accounts. As another example, selection of "employee name" as the key attribute could be used to generate a card for different employees in the data set. The key attribute may be used to define elements of the card's header, such as the name or title of the card, and one or more initial keywords for triggering presentation of the card.

Once the key attribute is selected, the system may populate a set of data elements 506, e.g., attributes and metrics shown as "key performance indicator elements" or "KPI elements," that are related to the selected key attribute in the data set. These data elements 506 can represent the types of data available in the data set for the objects of the type indicated by the key attribute. Each data element 506 may represent, for example, a column from a data cube or table. Data elements 506 may also represent the results of applying different functions or aggregations to a data set, e.g., computing a mean, maximum, minimum, or other measure based on the data set that the user selected in FIG. 4. The user can select from these data elements 506 to add them to the card. For example, the user may drag and drop the data elements 506 onto locations on a preview pane 510. As another example, the user may simply select desired data elements 506, and the system may arrange them.

The settings pane 502 may include a control, such as control panel 508 depicted in FIG. 5, that may enable a user to select a document to link to the card. The selected document can be indicated in the card, with a hyperlink or other control 509 that user can select to initiate opening of the selected document.

On the right hand side of the user interface 500, the preview pane 510 may show an example card presentation based on the current selections and settings from the user. Although the card format being defined may be used for each of the different accounts in the data set, the preview pane here shows and example card populated for a specific account, the account of "Example Co." This may allow the user to see the effects of changes and selections in real time as parameters of the card are adjusted. As shown in the example, each individual indicator can include a value for an attribute as well as a label or attribute name. For example, in the example depicted in FIG. 5, the indicator in the upper left corner includes the attribute label "status" and a value "C2—Major Customer." In some cases, other information may be provided in addition to or instead of indicator values in text or numeric form. For example, indicators may be represented with colors, icons, animations, images, charts, graphs, and so on. As shown in FIG. 5, the indicators in the bottom row may each have a line that indicates how the attributes have changed over a period of time. This may effectively include a graph in the indicator area to show a progression over a period of time (e.g., one month, three months, 1 year, etc.) as well as including the current value for the indicator.

The user interface 500 or another user interface can include controls to allow or restrict access to the generated card. For example, a control 512 can set whether to automatically publish the new card to user devices through browser extensions. Similar controls can be included for making cards available through other functionality, such as location-based presentation, e-mail applications, calendar applications, search functionality, messaging platforms, and so on. In addition, user interface controls can be provided to allow the user to specify specific users or user groups that can receive the current card type or, more generally, cards based on the current data set. Such access restrictions may apply to a category of cards, a collection of cards, or an individual card. In addition, particular indicators or other data elements displayed on a card may have access restrictions applied. For example, this may allow a user to view a card for a customer but not see certain private or sensitive information that the user does not have permission to access.

After the card is completed, the user can select a control 514 to save the card. From the selections on the interface 500, the system may save the card information to allow multiple cards that can be presented—not just a single card for the "Example Co." account, but a displayable card element for each unique value in the data set for the "Account Name" key attribute. As a result, if there are, for example, 20 accounts in the data set, saving the card format may allow the defined type of card to be displayed for any and all of the 20 different accounts. Of course, additional interfaces can be provided if desired to customize or adjust individual cards in addition to or instead of adjusting cards as a group.

To facilitate card generation, the system can make available standardized templates that a user can select to apply predetermined combinations of layout and formatting attributes. For example, a template may provide a three-by-three grid of containers, each configured to provide a metric or attribute, so the user can add 9 different data elements. The template can also include other elements such as a header region, a footer region, a title, etc. which can also be populated and customized. Of course, the interface can include controls allowing a user to set or adjust layout and formatting as well. The interface can enable a user to select elements of the data set and assign positions for the selected data elements to be displayed. For example, the interface can enable a user to drag data set elements (e.g., attributes, metrics, etc.) and drop the elements into specific fields or containers of a card template. Doing so can create links between the card and specific portions or elements of the data set, which can be used in an ongoing manner to refresh the content of the card from the current values in the data set.

When adding an element from the data set, the system can automatically configure properties of the card based on the characteristics of the data set. For example, when a user drags an attribute from a data set to a region of the card template, the system can identify a data type for the attribute value (e.g., text, integer, unit of time, dollar amount, geographical location, etc.) and apply formatting for that data type. The system can also look up a human-readable name or explanation for the attribute type, e.g., determining and adding to the card a "Number of Employees:" descriptor for the attribute value if the attribute represents a number of employees. In addition, the system can identify a record or portion of the data set representing that attribute. If the card being generated is for a specific company and the attribute is number of employees, for example, the system can identify and store, in card definition data, a field or set of records used to determine the value of the attribute from the data set for that specific company. In general, the card generation process creates mappings between elements of the card (e.g., portions of the card, or fields of a card template) with portions of the data set.

In some implementations, each information card can be created individually. For example, the process of creating cards can be done for each individual entity, e.g., a first card is created for "Company 1" with a first, custom subset of attributes and metrics included in the card; a second card is created for "Company 2," with second, different custom subset of attributes included in the card; and so on.

In some implementations, cards can be generated in groups or batches, for example, linked to a master card definition or card template that specifies card content types and not only general formatting and layout. This can speed the process of creating cards and can increase efficiency. For example, the system may create one generic entity type card for object type "employee." This entity type card can be used to provide card presentations for all objects of the "employee" type, with the card presentation for a specific employee having card content and metadata (e.g., keywords for triggering) populated from the attribute values for the specific employee.

As an example, the interface can enable a user to create a card representing an entity type (e.g., a supplier company, a customer company, an employee, a person, etc.), and provide indications of the data elements available for entities of that entity type. Once the template or generic entity type card for the entity type is specified by the user, the system can use it to create cards for any entity of the entity type that is in the data set. This can enable many cards to be created quickly, and with uniformity in the content of the cards (e.g., with the same or similar subsets of attributes and metrics for entities of the same type). The system may derive, from the template or generic entity type card, a specific card definition for each entity of the entity type. The individually-defined cards can then be separately customized and edited further, since even for entities of the same type different individual entities may have differing types of information that is most relevant. This can include creating separate card definitions for each entity's card, and specifying in those cards the links to the data set needed to populate each card with the corresponding entity's data. In some implementations, a user may create a card for a single instance of an entity type, and then select to apply the characteristics of that card to other instances of the same entity type. For example, a user may create a card for a first company, then extend the card definition (e.g., the selection of attributes and metrics, the organization and formatting, etc.) to all other companies described in the data set, thus creating a card of the same type for each of the companies. In other implementations, a template or generic entity type card can be stored and can be used repeatedly to dynamically create cards for entities of a particular type, without storing separate individual card definitions for individual entities.

The information cards can include embedded rules or conditions that may vary the content or presentation of the cards based on different conditions. For example, the inclusion of certain content or the formatting of content can be conditional. Thresholds can be set for an attribute or metric, and if the value meets predetermined criteria (e.g., inside or outside of a certain range), that attribute may be highlighted or otherwise emphasized. Rules or conditions defined for a card can also be used to personalize the card for different types of end users. For example, the rules may specify that one attribute is shown for users in one department and a different attribute is shown instead for users in a second department.

The system may use machine learning to automatically generate cards or to suggest content for cards. In some cases, the system can predictively suggest cards to be generated and content for the cards (e.g., subsets of attributes and metrics that are most commonly used). For example, the system can access usage data indicating, for example, rates of co-occurrence of different terms in documents of an organization, query histories from users of the organization, counts of interactions with different elements of documents, time spent viewing or interacting with different documents, and so on. From this usage data, the system may infer which entities referenced in a data set are most significant as well as which attributes and metrics are most often used with those entities or entities of the same types. The system can then recommend the creation of cards for the identified entities, and can recommend that the most commonly used attributes and metrics be presented in the cards. As users view cards and interact with the cards, the system can record further usage information that the system can use to alter the content of cards and to provide better recommendations in the future.

As noted above, each card can be designed with one or more key terms (e.g., words, phrases, numbers, data points, patterns, etc. referred to generally as "keywords" herein) specified for the card, so that the occurrence of the one or more keywords can trigger the presentation of the card. Users may manually enter these keywords, select them from values taken from the data set linked to the card, or enter them in other ways. In some implementations, the keywords are values corresponding to attributes associated with a card. The system may suggest keywords to the user for inclusion as well, based on characteristics of the data set and other cards. The card creation user interface can provide information about an attribute of an entity as well as synonyms. For example, a user may define a card for a person, and specify that the card title (e.g., a primary key) is the person's name (e.g., a "name" attribute from the data set). This selection can also cause the system to import other attributes as keywords to trigger presentation, such as an "initials" attribute in the data set, a "nickname" attribute, and others, and link these attributes with the same card. The values of all of these attributes can be set as keywords that can be used to trigger presentation of the card. In some cases, the related attributes may be taken from a data set different from the data cube or other data set that a user selects as the basis for the card. For example, the system can use an entity identifier from the data cube or even as manually specified by the user creating the card to retrieve other information from a different data source, which can be added to the user interface and used to define the card.

The keywords for a card may or may not appear visibly in the card. For example, the name of an entity may appear in the card, and the name may be a keyword for the card. In addition, any of the other values in the card may also be potentially used as keywords for the card, automatically or through manual selection of the card's creator. As a result, keywords are not required to match only to the name or primary attribute for a card. As an example, a card for a person may include the name of a company the person works for as an attribute derived from a data source and displayed in the card. Similarly, the occurrence of a keyword that triggers display of the card may or may not include display of the keyword on a display of a client device. In many instances, at least some keywords that can trigger presentation of a card are not displayed in the card and instead are stored in metadata.

In some implementations, cards are designed with specified conditions for presentation instead of, in addition to, and/or in combination with keywords. For example, each card can have metadata, such as hidden fields or associated parameters that are not visually displayed in the card but are stored and evaluated by the system. This metadata can specify contextual attributes that specify when a card should be displayed or otherwise made available. These contextual attributes can include locations, times, the presence of certain devices or users (or devices or users of certain types or classifications), the occurrence of an event related to an entity, an attribute or metric for the entity meeting particular thresholds or having a particular status (whether the attribute or metric is shown in the card or not), and so on. With these contextual attributes defined, a card can be automatically presented or made available when, for example, a user's device is near any person from a specific department, when the user's device is near a specific person, or when the user's device is in a specific geographical area or in a specific type of geographical area (e.g., within a retail store). There can be multiple different contexts or conditions that each separately trigger displaying of a card, and each context may be defined in terms of multiple contextual attributes (e.g., time, location, conditions or thresholds for data about the organization being met, etc.).

These contextual triggers defined for cards can be especially helpful for use with shared displays, such as display 115 shown in FIG. 1. Some attributes or contextual factors may be focused specifically on use cases for shared displays. As an example, a card may have embedded metadata of user identities and associated access rights so that the client device receiving the card knows that a card, or a subset of data within a card, should only be displayed when certain users are viewing the display. The client device then can surface the card or data elements for the for the set of users viewing the display.

When a user creates a card, the card is linked to the data source(s) that the user selected, such as a specific data cube. As a result of this linkage, data security and access control for the underlying data source(s) flow through to the content of the card. Access restrictions are enforced for each user, each card, and each time the card is displayed. By applying identity-based or object-level security policies, if a user is not authorized to access data for any of the different information elements within the card, the system will generate the card to show a dash, a blank area, or other indication that the data is not available. This allows for control of security at a fine-grained level.

In some implementations, different cards may be created for different user roles or different groups of users. For example, for a given company, a different card or card template may be used to generate cards shown to users in an engineering department that have different content (e.g., show different attributes and metrics) than cards shown to users in the finance department. When multiple cards are available, the different cards can be targeted to different users based on, for example, a user's role, interests, user profile, usage history, and so on.

Cards that are created can be published to allow access to specific users and sets of users. For example, the system may provide an interface that identifies users and available cards, and that allows an administrator to manually add or remove users from an access list. This can be done for individual users and with respect to individual cards or at a higher level of aggregation. For example, the system may group cards by entity type (e.g., supplier company, customer company, location, etc.), by author, by data source, by keyword or subject matter, by types of metrics and attributes included, and so on. Similarly, the system may group users by user type, role, location, access privileges or credential type, department in an organization, similarity in usage patterns, and so on. The interface to the system may indicate one or more of these different aggregations of cards and users, and can provide controls that allow an administrator to select a card or group of cards to be made available for a group of users. The system can also certify card content (e.g., with certificates, signatures, etc.) to indicate the information is trusted, and can verify the certification on presentation to ensure that only legitimate content appropriate for the user is provided by the system.

Figure 6:
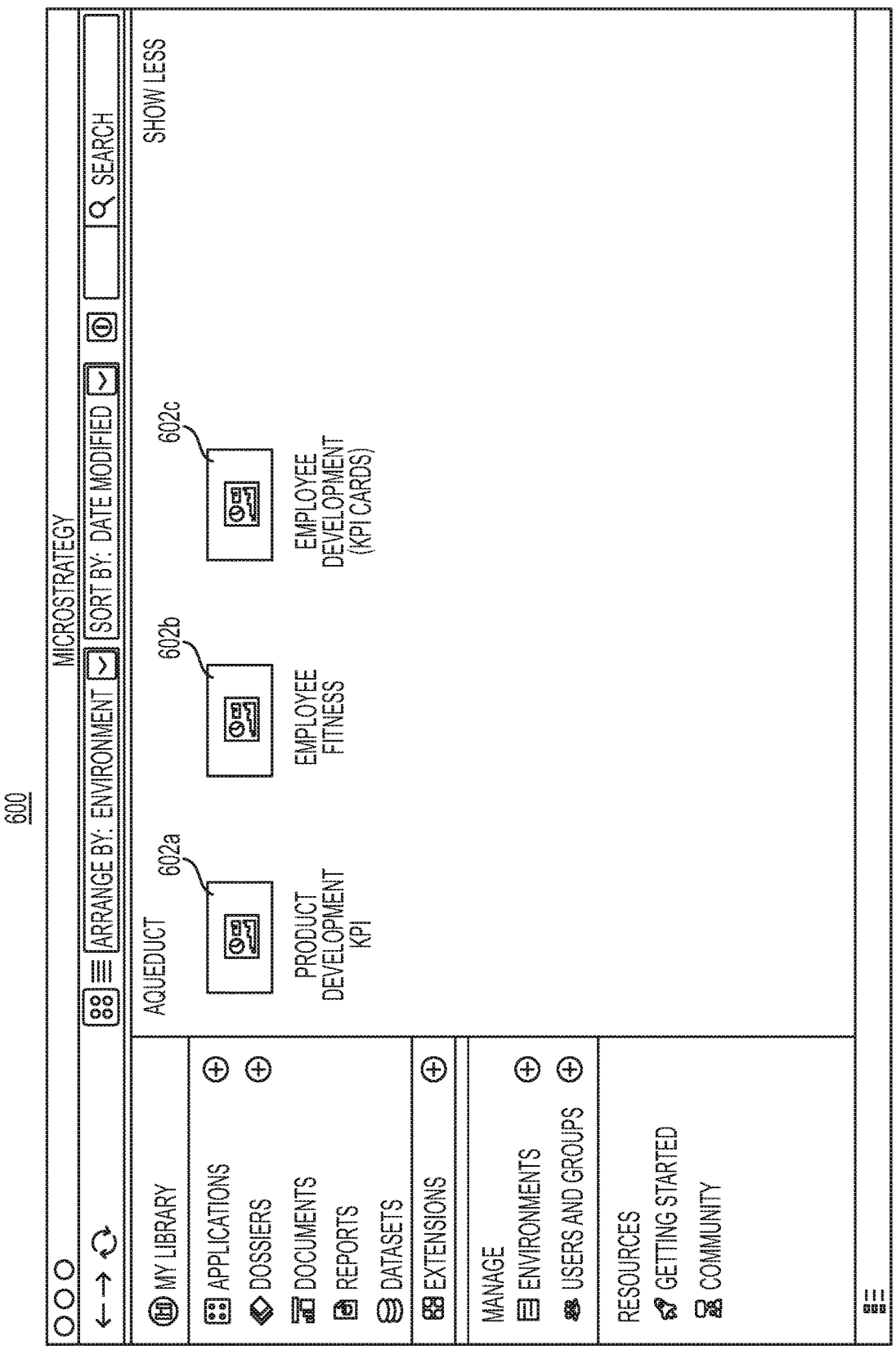

FIG. 6 shows a user interface 600 that the system can provide to allow management of created cards. The user interface 600 can provide a central interface to author and manage all embedded and extended content. The interface 600 shows objects 602a-602c, each of which represent a card or collection of cards. From this interface 600, the user can drag and drop cards to different computing environments to make them available on different servers and to different sets of users. The user interface can also allow the user to set access control restrictions, assign cards to specific users or user groups, adjust the keywords or contextual factors for presentation of cards, and adjust other parameters of the cards. In addition, the interface 600 may include controls that adjust how the cards 602a-602c are managed by the server and client devices, such as to specific whether and to what extent a card or its underlying data set should be cached at the server or client devices, a frequency that cached data should be refreshed, and so on.

FIG. 7A shows an example of a card 700 being generated or edited. The card includes several regions for the placement of indicators (e.g., attributes, metrics, etc.), with the various regions being designated with dashed lines. A first region 702 represents an "Assets" element, and a user has selected a control in the region 702 to edit the formatting or display properties. This interaction caused an overlay panel 704 to be displayed, with various controls for adjusting how the data values for the attribute will be displayed. Options include setting the number of digits, including abbreviations, punctuation, a prefix, a suffix, and so on. The content of the overlay panel for an indicator can vary based on the data type of an attribute value as well as metadata from the data set from which the attribute is derived. In addition to the adjustments shown on the panel 704, the contents of the different regions 702 can altered, for example, the indicator specified can be deleted, replaced with a different indicator, can be expanded or restricted to cover a different time range, and so on.

FIG. 7B shows another example of a card 710 being generated or edited. The interface shows a panel 712 that allows an interactive control, such as a hyperlink, to be added and edited, to provide access to other content within or outside the analytics platform.

Figure 8:
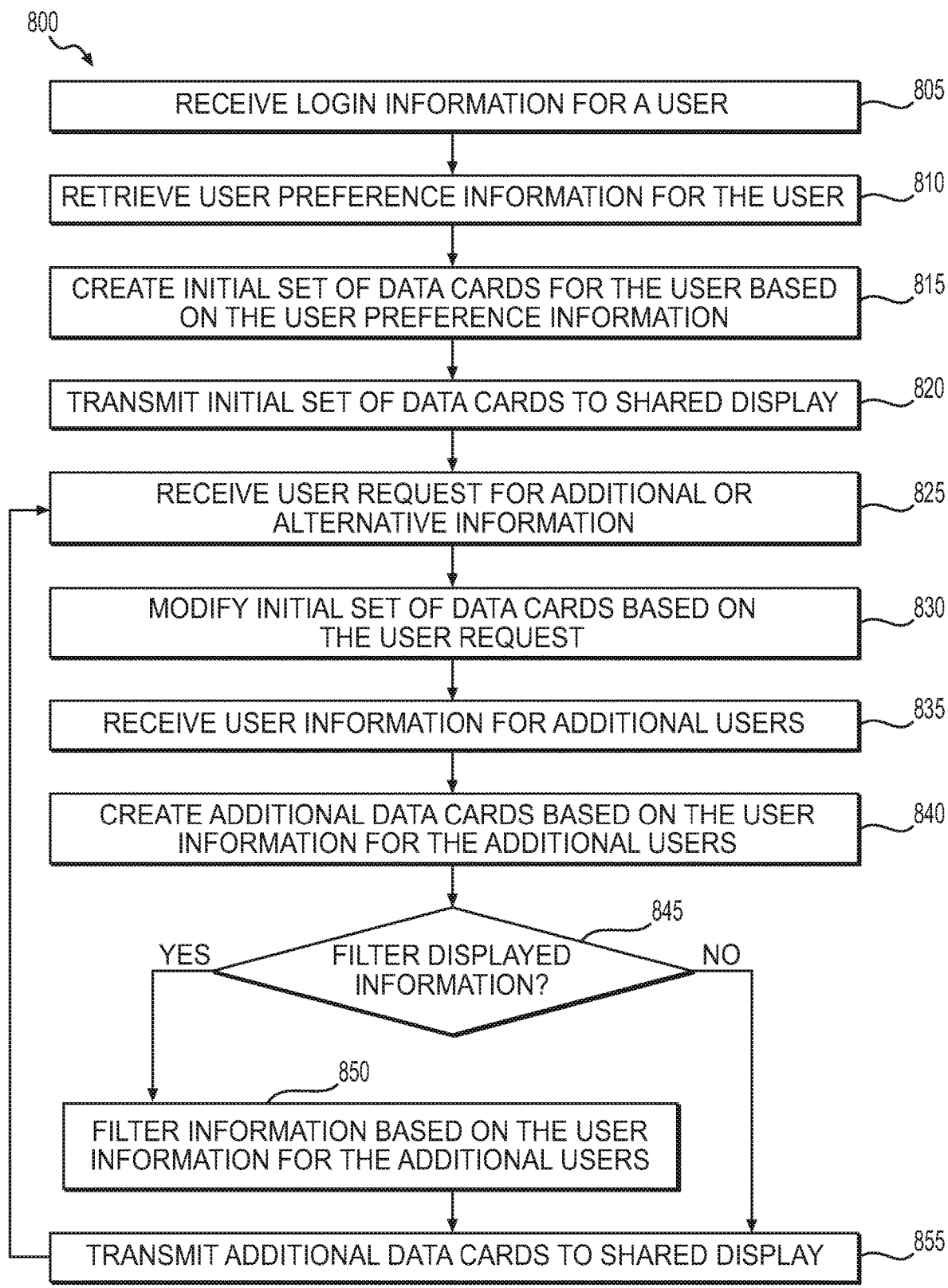
FIG. 8 depicts a flowchart of a method of analytics presentation on large displays, according to one or more embodiments.

FIG. 8 depicts a flowchart of a method of analytics presentation on large displays, according to one or more embodiments. As shown in FIG. 8, in operation 805, client device 110 may receive login information for a user, such as primary user 105a shown in FIG. 1. In operation 810, client device 110 may retrieve user preference information for the user. In one or more embodiments, the user preference information may be obtained from an external server or database. In operation 815, client device 110 may create an initial set of data cards for the user based on the user preference information. In one or more embodiments, the set of data cards may be obtained from an external server, such as server 125 depicted in FIG. 1. In operation 820, client device 110 may transmit the initial set of data cards to a shared display, such as shared display 115 shown in FIG. 1. In operation 825, client device 110 may receive a request for additional or alternative information from the logged-in user. In operation 830, client device 110 may modify the initial set of data cards based on the user request. In operation 835, client device 110 may receive user information for additional users associated with the shared display, such as an additional user 105b viewing the contents of the shared display, as shown in FIG. 1. In operation 840, client device 110 may create additional data cards based on the user request and/or the user information for the additional users. In operation 845, client device 110 may determine whether to filter the displayed information. For example, additional user 105b may not have access permission for some of the information to be displayed in the initial set of data cards or the additional data cards. If client device 110 determines that some information should be filtered, then, in operation 850, client device 110 may filter the displayed information based on the user information for the additional users. For example, if at least one user viewing the shared display is not authorized to access data for any of the different information elements within an information card, the system may generate the information card to show a dash, a blank area, a solid color, or other indication that the data is not available. Subsequently, in operation 855, client device 110 may transmit the updated and/or additional data cards to shared display. The method may then return to operation 825 to wait for additional user interactions.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method for analytics presentation on large displays, the method comprising:
    receiving login information for a user associated with a first user device;
    retrieving, from a database, user preference information for the user;
    obtaining an initial set of information cards based on the user preference information;
    transmitting the initial set of information cards to a shared display device viewed by a plurality of viewers including the user, wherein the user has permission to view information included in the initial set of information cards;
    receiving login information for a second user not among the plurality of viewers;
    determining that a second user device associated with the second user is within a predetermined physical proximity of the shared display device, the predetermined physical proximity being based on a space in which the shared display device is located;
    retrieving, from the database, user information for the second user;
    determining, based on the user information for the second user, a role of the second user;
    automatically modifying, based on the determined role of the second user and the determination that the second user device is within the predetermined physical proximity of the shared display device, the initial set of information cards transmitted to the shared display device to obscure sensitive information included in the initial set of information cards, wherein the sensitive information is a subset of the information included in the initial set of information cards, and wherein the second user does not have permission to view the sensitive information; and
    transmitting the modified set of information cards to the shared display device such that the initial set of information cards are not visible to the second user.

2. The computer-implemented method of claim 1, further comprising:
    receiving, user information for one or more additional users;
    obtaining additional information cards based on the user information for the one or more additional users;
    determining whether data in the additional information cards should be filtered based on the user information for the one or more additional users;
    upon determining that data in the additional information cards should be filtered, filtering data in the additional information cards based on the user information for the one or more additional users; and
    transmitting the additional information cards to the shared display device.

3. The computer-implemented method of claim 2, wherein data in the additional information cards is filtered further based on a proximity of each user among the one or more additional users to a client device associated with the user or the shared display device.

4. The computer-implemented method of claim 2, wherein the one or more additional users are determined based on a user login, face recognition, voice recognition, or other biometric detection, or detection of a registered mobile device near a client device associated with the user by Bluetooth, Wi-Fi, or other wireless technology.

5. The computer-implemented method of claim 2, wherein filtering data in the additional information cards comprises replacing the filtered data in the additional information cards with a dash, a blank area, a solid color, or other indication that the data is not available.

6. The computer-implemented method of claim 2, wherein transmitting the additional information cards to the shared display device is triggered by at least one of voice commands, gestures, touch screen features, a pointer, a mouse, an external keyboard, or other user interface device.

7. The computer-implemented method of claim 2, wherein transmitting the additional information cards to the shared display device is triggered by at least one of a selection of one or more favorite information cards, a request to display a specified information card, a search for information cards matching specified criteria, or a request to dismiss a currently displayed information card.

8. A system for analytics presentation on large displays, the system comprising:
at least one data storage device storing instructions for analytics presentation on large displays in an electronic storage medium; and
at least one processor configured to execute the instructions to perform a method including:
receiving, login information for a user associated with a first user device;
retrieving, from a database, user preference information for the user;
obtaining an initial set of information cards based on the user preference information;
transmitting the initial set of information cards to a shared display device viewed by a plurality of viewers including the user, wherein the user has permission to view information included in the initial set of information cards;
receiving login information for a second user not among the plurality of viewers;
determining that a second user device associated with the second user is within a predetermined physical proximity of the shared display device, the predetermined physical proximity being based on a space in which the shared display device is located;
retrieving, from the database, user information for the second user;
determining, based on the user information for the second user, a role of the second user;
automatically modifying, based on the determined role of the second user and the determination that the second user device is within the predetermined physical proximity of the shared display device, the initial set of information cards transmitted to the shared display device to obscure sensitive information included in the initial set of information cards, wherein the sensitive information is a subset of the information included in the initial set of information cards, and wherein the second user does not have permission to view the sensitive information; and
transmitting the modified set of information cards to the shared display device such that the initial set of information cards are not visible to the second user.

9. The system of claim 8, wherein the system is further configured for:
receiving, user information for one or more additional users;
obtaining additional information cards based on the user information for the one or more additional users;
determining whether data in the additional information cards should be filtered based on the user information for the one or more additional users;
upon determining that data in the additional information cards should be filtered, filtering data in the additional information cards based on the user information for the one or more additional users; and
transmitting the additional information cards to the shared display device.

10. The system of claim 9, wherein data in the additional information cards is filtered further based on a proximity of each user among the one or more additional users to a client device associated with the user or the shared display device.

11. The system of claim 9, wherein the one or more additional users are determined based on a user login, face recognition, voice recognition, or other biometric detection, or detection of a registered mobile device near a client device associated with the user by Bluetooth, Wi-Fi, or other wireless technology.

12. The system of claim 9, wherein filtering data in the additional information cards comprises replacing the filtered data in the additional information cards with a dash, a blank area, a solid color, or other indication that the data is not available.

13. The system of claim 9, wherein transmitting the additional information cards to the shared display device is triggered by at least one of voice commands, gestures, touch screen features, a pointer, a mouse, an external keyboard, or other user interface device.

14. The system of claim 9, wherein transmitting the additional information cards to the shared display device is triggered by at least one of a selection of one or more favorite information cards, a request to display a specified information card, a search for information cards matching specified criteria, or a request to dismiss a currently displayed information card.

15. A non-transitory machine-readable medium storing instructions that, when executed by a computing system, causes the computing system to perform a method for analytics presentation on large displays, the method including:
receiving login information for a user associated with a first user device;
retrieving, from a database, user preference information for the user;
obtaining an initial set of information cards based on the user preference information;
transmitting the initial set of information cards to a shared display device viewed by a plurality of viewers including the user, wherein the user has permission to view information included in the initial set of information cards;
receiving login information for a second user not among the plurality of viewers;
determining that a second user device associated with the second user is within a predetermined physical proximity of the shared display device, the predetermined physical proximity being based on a space in which the shared display device is located;
retrieving, from the database, user information for the second user;
automatically modifying, based on the user information for the second user and the determination that the second user device is within the predetermined physical proximity of the shared display device, the initial set of information cards transmitted to the shared display device to obscure sensitive information in a field of the initial set of information cards based on a security level set for the field specific to the second user included in the initial set of information cards, wherein the sensitive information is a subset of the information included in the initial set of information cards, and wherein the second user does not have permission to view the sensitive information; and transmitting the modified set of information cards to the shared display device such that the initial set of information cards are not visible to the second user.

16. The non-transitory machine-readable medium of claim 15, the method further comprising:
receiving, user information for one or more additional users;
obtaining additional information cards based on the user information for the one or more additional users;
determining whether data in the additional information cards should be filtered based on the user information for the one or more additional users;
upon determining that data in the additional information cards should be filtered, filtering data in the additional information cards based on the user information for the one or more additional users; and
transmitting the additional information cards to the shared display device.

17. The non-transitory machine-readable medium of claim 16, wherein data in the additional information cards is filtered further based on a proximity of each user among the one or more additional users to a client device associated with the user or the shared display device.

18. The non-transitory machine-readable medium of claim 16, wherein the one or more additional users are determined based on a user login, face recognition, voice recognition, or other biometric detection, or detection of a registered mobile device near a client device associated with the user by Bluetooth, Wi-Fi, or other wireless technology.

19. The non-transitory machine-readable medium of claim 16, wherein filtering data in the additional information cards comprises replacing the filtered data in the additional information cards with a dash, a blank area, a solid color, or other indication that the data is not available.

20. The non-transitory machine-readable medium of claim 16, wherein transmitting the additional information cards to the shared display device is triggered by at least one of voice commands, gestures, touch screen features, a pointer, a mouse, an external keyboard, or other user interface device.

* * * * *